United States Patent [19]

Klumpp

[11] 4,248,394
[45] Feb. 3, 1981

[54] REMOTE CONTROL HANG GLIDER TOWING AIRCRAFT

[76] Inventor: Marlin K. Klumpp, 1520 Avondale, Ann Arbor, Mich. 48103

[21] Appl. No.: 17,411

[22] Filed: Mar. 5, 1979

[51] Int. Cl.³ .............................................. B64D 3/00
[52] U.S. Cl. ........................................ 244/3; 244/16; 244/DIG. 1
[58] Field of Search ............... 244/3, 16, DIG. 1, 190; 242/107

[56] References Cited

U.S. PATENT DOCUMENTS

| | | | |
|---|---|---|---|
| D. 243,594 | 3/1977 | Koch | 244/DIG. 1 |
| 2,969,934 | 1/1961 | Gallagher et al. | 244/190 |
| 2,991,959 | 7/1961 | Rizzo | 244/3 |
| 3,272,457 | 9/1966 | MacMillan | 244/3 X |
| 3,744,759 | 7/1973 | Jennings | 242/107 |
| 3,817,472 | 6/1974 | Abe | 242/107 |
| 3,957,230 | 5/1976 | Boucher et al. | 244/190 X |

FOREIGN PATENT DOCUMENTS

2752182  6/1978  Fed. Rep. of Germany .... 244/DIG. 1

OTHER PUBLICATIONS

Welch, "Hang-Gliding Review", *Flight International*, Dec. 1977, pp. 1741-1744.
"SO-LO Volmer VJ-11", *Hang Gliding*, by D. Poynter, 1976, p. 152.

*Primary Examiner*—Barry L. Kelmachter
*Attorney, Agent, or Firm*—Hauke and Patalidis

[57] ABSTRACT

A remotely controlled powered aircraft equipped with engine, propeller and landing gear, radio-controlled from the ground and capable of towing a manned hang glider to an appropriate altitude. On reaching altitude, the pilot of the hang glider releases the tow, and the pilotless towing aircraft is returned to the launching site under radio control from the ground. During towing of the hang glider, two-way communication is maintained between the hang glider pilot and the towing aircraft remote pilot.

13 Claims, 6 Drawing Figures

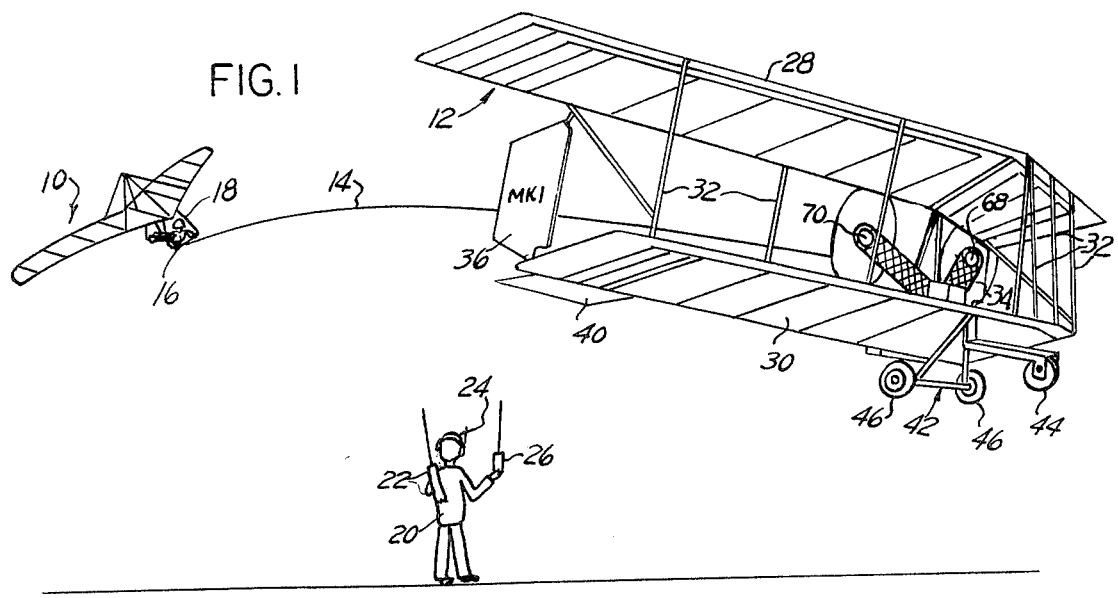
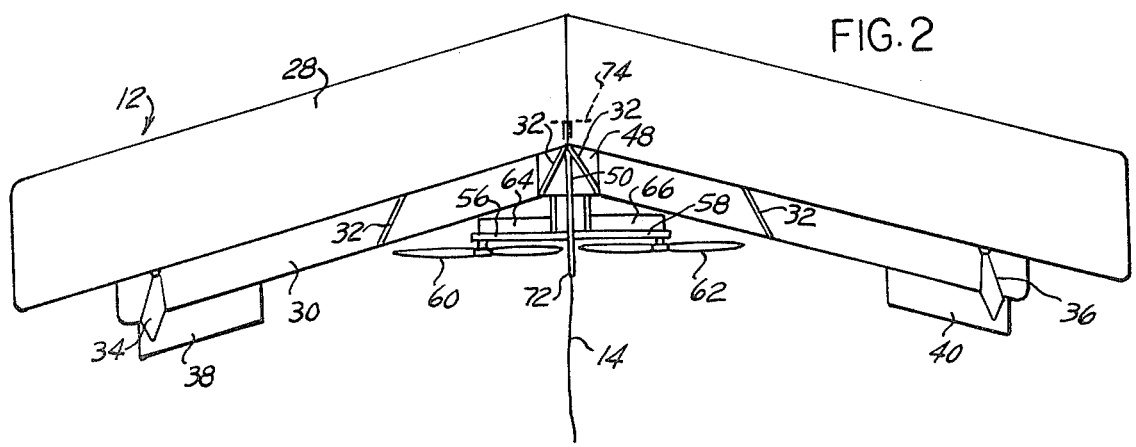
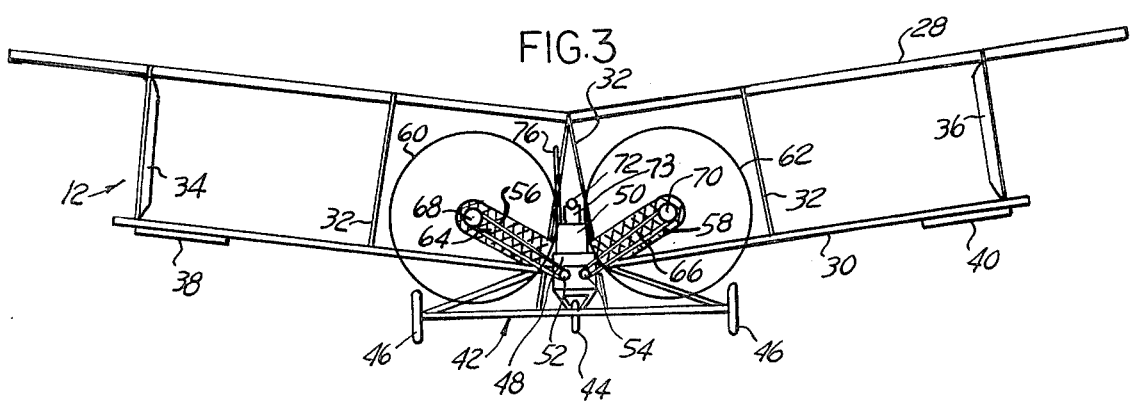

REMOTE CONTROL HANG GLIDER TOWING AIRCRAFT

BACKGROUND OF THE INVENTION

The present invention relates to hang gliding in general and more particularly to a method and to a combination of elements for launching aloft a piloted hang glider by means of an aerial tow consisting of a powered pilotless aircraft remotely controlled from the ground.

Hang gliding is generally considered to be the precursor of modern aviation. George Cayley in England in the middle of the nineteenth century, Otto Lilienthal in Germany and Percy Pilcher in England, at the end of the nineteenth century, practiced hang gliding. Wilbur and Orville Wright's first Flyer was a form of hang glider.

Hang gliding has recently become a very popular sport practiced by many enthusiastic flyers, as a result of the work of Francis M. Rogallo investigating for NASA the use of para-gliders as recovery devices for manned spacecraft. A Rogallo wing is a kite-like structure in the form of a low aspect-ratio delta wing with a simple frame covered by a lightweight material, Dacron or the like, below which is mounted a support harness for the pilot who, by pulling and pushing on a horizontal control bar or trapeze, which is attached by cables or rigid rods to the wing keel and by cables to the tips of the wing, controls the glider in flight by moving his body fore and aft to shift the center of gravity relative to the center of lift of the wing, and sideways for banking and thus turning.

Since the appearance of the Rogallo wing, many other types of hang gliders have been developed, successfully flown and manufactured. As a result, many designs and types of hang gliders can today be found on the market, of the monoplane as well as biplane type, of the tailless as well as of the tailed type, and some provided with directional control surfaces. Although the trend is towards gliders having higher aspect ratio wings, which in turn has resulted in improved glide ratios thus resulting in soaring of longer duration and greater distance, launching without assist remains the principal obstacle to full enjoyment of the sport of hang gliding, as long as launching remains the timehonored method of running upwind down a slope, in order to gain critical flying speed. As long as the angle of the slope or hillside is greater than the gliding angle, the hang glider lifts itself into the air when its air speed reaches approximately 15 to 20 mph, and is thus able to glide to the bottom of the slope or hill, the pilot taking advantages of any lift provided by thermals or any ascending air currents caused by the wind blowing up the slope or the hillside to prolong his flight. Such a method of launching requires appropriate launching sites with appropriate hilly or mountainous terrain, which are not always available in the near vicinity.

Several methods and devices can be used to launch manned hang gliders from the ground, in order to permit soaring flights notwithstanding the absence of hills, dunes or mountains. Such launch assist methods or means include towing the hang glider behind a motor boat or a land motor vehicle, by means of a winch, or by means of a powered light aircraft. Hang gliders have also been launched at altitude from hot air balloons. Power assist for hang gliders such as small gasoline engine driving a conventional propeller, and even small low thrust jet engines have appeared on the market. Such power assists are attached to the hang glider and permit limited power flight to altitude, or cruising on power.

Towing a hang glider behind a motor boat or behind a land motor vehicle, and launching by means of a winch present many problems and limitations, the most important of which is a limit on the altitude which the hang glider can reach when launched by means of such assist. Launching from a hot air balloon is much less altitude limited but it is very expensive and requires special skills on the part of the hang glider pilot, as the launch is effected without air speed and consists in a vertical drop followed by a stall recovery. Providing a hang glider with an auxiliary power in the form of a small gasoline engine and propeller, or a jet engine, is also costly, and is considered by other flyers as a noisy and undesirable nuisance and somewhat of a heresy. When the engine is stopped, soaring, unassisted, becomes somewhat limited in view of the increase in gross weight due to the weight of the powerplant and the additional drag created by the propeller and the powerplant frontal area, and stalling and landing speeds are appreciably increased. As a result, power assisted hang gliders tend to evolve in the direction of uncertified light aircrafts, to the point that even landing gears for motorized hang gliders have now appeared on the market.

Although towing a high aspect ratio conventional glider or sail plane to altitude behind a light powered aircraft is a conventional method for rapidly launching a great number of gliders in succession, such method has very seldom been used for towing hang gliders, because of the many problems involved, the most important of which is the difference in speed ranges between a conventional hang glider and a light aircraft. The maximum air speed of the majority of hang gliders is much less than the minimum flying speed or take-off speed of the majority of light aircrafts. In other words, a light aircraft towing a hang glider takes off at an air speed which is beyond the maximum, or "never exceed" air speed, to say nothing of the maximum maneuvering air speed, of the hang glider.

The present invention provides a powered towing aircraft which enables a hang glider to be towed to altitude and launched from such altitude over any kind of terrain, including flat ground. The towing aircraft of the invention provides an adequate thrust for take-off and climb to altitude with a hang glider in tow, has a low minimum air speed matching the hang glider minimum air speed, and a climb air speed and climb rate closely matching those of a conventional hang glider, is pilotless but highly controllable, does not place any excessive demand on the flying ability of the pilot of the towed hang glider, and provides at least a level of safety comparable to other means of launching a hang glider, such as by means of a winch, or by towing behind a land or a water vehicle.

The minimum thrust required for enabling a hang glider with its pilot to maintain flight, with enough reserve power for a moderate rate of climb, in a standard density and temperature day is in the neighborhood of 80 lbs. The thrust applied to a towed hang glider by a towing aircraft must therefore be at least 80 lbs. and preferably have a value of around 100 lbs. Most conventional hang gliders have a practical air speed range of about 16–20 mph minimum to about 35–45 mph maximum. The towed climbing speed for hang glider is therefore in the range of approximately 25 to 30 mph, and therefore the minimum air speed of a towing aircraft for a hang glider should not be greater than about 25 mph, and the towing aircraft must be fully controllable at such a low speed. A climbing speed, slightly above the take-off speed, must be maintained to altitude, under control, in order not to overstress the structure of the hang glider and its pilot's ability to cope with excessive demands upon his flying skill.

All those requirements are fulfilled by the present invention, and furthermore the present invention provides a reasonable amount of safety in view of the fact that the towing aircraft is pilotless and that disconnect between the towing aircraft and the towed hang glider is under the control of the hang glider pilot who can always safely disconnect and make a relatively normal landing irrespective of what may happen to the towing aircraft.

SUMMARY OF THE PRESENT INVENTION

The present invention accomplishes its purposes by providing a towing aircraft, remotely controlled from the ground, whose specifications closely match those of a towed hang glider, and which is capable of towing the hang glider and its pilot to an appropriate launching altitude, the towing aircraft remote pilot, on the ground, constantly remaining in radio communication with the hang glider pilot. The many objects and advantages of the present invention will become apparent to those skilled in the art when the following description of the best modes contemplated for practicing the invention is read in conjunction with the accompanying drawing wherein:

BRIEF DESCRIPTION OF THE DRAWING

FIG. 1 is a schematic perspective view of an example of a remote control powered aircraft towing a piloted hang glider to altitude while being remotely controlled from the ground, according to the present invention;

FIG. 2 is a plan elevation view, from the top, of the towing aircraft of FIG. 1;

FIG. 3 is a rear elevation view thereof;

DETAILED DESCRIPTION OF THE PREFERRED EMBODIMENT

Figure 4:
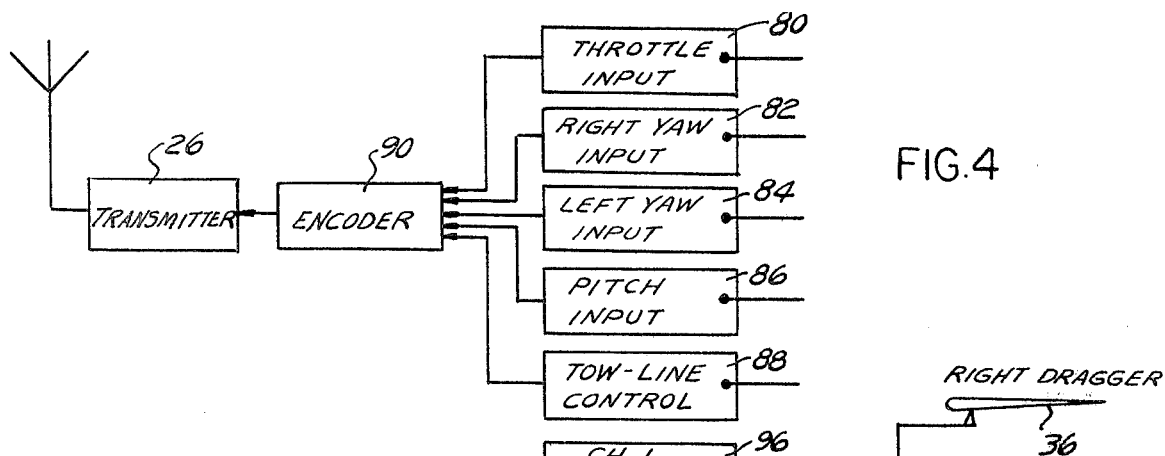
FIG. 4 is a schematic block diagram of the remote radio control thereof.

Referring now to the drawing, and more particularly to FIG. 1 thereof, a conventional hang glider 10 is illustrated under tow by a remote radio control powered aircraft 12, through a towline 14. The tractor aircraft 12 is pilotless but the hang glider 10, provided in a conventional manner with an appropriate pilot supporting harness mounted under its wing, carries a pilot 16 who controls the flight of the hang glider by means of a control bar 18. The hang glider pilot 16 is in radio voice-communication with the crew member 20 on the ground, such as to be at all time able to give instructions to and receive instructions from the ground crew member 20. For the purpose of two-way radio communication, the hang glider 10 is equipped with a low power radio receiver-transmitter, of the type currently referred to as "walkie-talkies", operating at any appropriate frequency, such as the 27 megacycle "citizen band" frequency or any other higher frequency. The radio receiver-transmitter may be carried by the hang glider pilot 16 in a pocket of his clothing apparel, or attached to his crash helmet or, in the alternative, attached to the hang glider superstructure such as the control bar structure. The audio output of the receiver is provided through an earphone embedded in the ear convering portion of the crash helmet interior lining, and the microphone is preferably a conventional miniature microphone as available on the market in the form of a headset comprising earphone and a microphone in a single assembly commonly used by aircraft pilots, air traffic controllers and telephone operators. The microphone relay may be voice-operated or, in the alternative, operated by a "press to talk" button switch attached to the glider control bar. In a similar manner, the ground crew member 20 carries a radio receiver-transmitter 22 connected to an earphone-microphone headset 24, to free his hands for operating a radio control transmitter 26.

The example of tractor aircraft 12, illustrated at FIGS. 1-3 is of the tailless biplane type sold under the trademark "EASY RISER" by the Ultra-Light Flying Machine Co., for convenience and illustrative purpose, although it will be appreciated that the tractor aircraft may be in the form of any one of the hang gliders presently available on the market which are capable of easy conversion to a power glider by addition of an appropriate small internal combustion engine and propeller unit, also readily available on the market.

The example of tractor aircraft 12 illustrated has a pair of swept-back rectangular wings, the upper wing 28 having a slightly wider span, of approximately 30 feet, than the lower wing 30. Appropriate strut members 32 interconnect the upper wing 28 and the lower wing 30. Proximate each wing tip, and disposed between the two wings, there is a substantially vertically disposed control surface, or "dragger", 34 and 36 respectively, which is controllably operable for pivoting about a vertical axis from a position aligned with the axis of flight to a position at an angle thereto providing, by differentially operating either the left "dragger" 34 or the right "dragger" 36, a turn to the left, or a turn to the right as a result of increased induced drag applied to the left wing tip or to the right wing tip. Because of the high dihedral of the wings 28 and 38, any turn results in an appropriate banked turn without the aid of ailerons for rolling into the turn. The structure formed by the wings 28 and 30, including the struts 32, is a generally rigid structure which, when operated as a piloted hang glider, has a minimum flying speed and a maximum flying speed matching the minimum and maximum flying speeds other types of hang gliders, such as the hang glider 10. When operated as a piloted hang glider, yaw control is effected by the pilot by means of appropriate separate control cables connected to the control horn of either dragger 34 or dragger 36, which causes selective deflection of the appropriate dragger for turning in the desired direction. Turns are thus effected by the pilot without lateral shift of his body's center of gravity. For pitch control, the pilot shifts his body's center of gravity forward and aft in the conventional manner, in hang gliding.

For the purpose of the invention, a pair of elevator surfaces, 38 and 40, are additionally mounted at the trailing edge of one of the wings, for example the lower wings 30, proximate each wing tip. The elevators 38–40 are hingedly connected at their leading edge to the trailing edge of the wing, and are arranged for simultaneous operation in unison through conventional horns and control cables, not shown.

A tricycle landing carriage 42 is mounted below the lower wing 30. The landing carriage 42 has a nose wheel 44 which is preferably of the trailing arm free-castering type to facilitate automatic alignment of the aircraft 12 into a head wind at take-off, or after touchdown at landing. For the sake of simplicity, the main wheels 46 of the tricycle undercarriage 42 are not provided with brakes, and the nose wheel 44 is not controllably steerable. This arrangement generally presents no problem but would generally require that the tractor aircraft 12 be hand-towed for taxiing to its take-off position, and again hand-towed after landing. However, for complete remote control of the tractor aircraft 12 while taxiing, during take-off and during roll-out after landing, the nose wheel 44 may be provided with a steering servo, at the cost of one additional channel in the remote radio control system. Alternatively, the main wheels 46 may be provided with servo-actuated differential brakes, at the cost of two additional channels in the radio control link or, alternatively and preferably, at the cost of the brakes and servos alone, operated through the same two channels which operate the servos of the draggers 34 and 36 as will be hereinafter explained.

A housing 48 is mounted on the top of the lower wing 30 at its center. Preferably, the housing 48 has appropriate mounting means, resilient to a certain degree such as internal combustion engine mounts, directly supported by and fastened to the landing gear undercarriage 42 as well as being attached to the main spar or other framework of the lower wing. A portion of the housing 48 supports a light internal combustion engine 50, preferably air-cooled which, alternatively, may be mounted directly, through appropriate shock absorbing means, to the wing spar and attachment points of the landing gear 42. The engine 50 drives through an appropriate gear reduction drive or pulley and belt reduction drive a pair of output pulleys 52 and 54, projecting rearwardly from the rear portion of the housing 48. By means of reverse belting in the drive ratio reduction system, or by means of a reverse gear, one of the two drive pulleys 52 and 54 rotates in a reverse direction relative to the other. By means of belts 56 and 58, respectively, the drive pulleys 52 and 54, respectively, drive contra-rotating pusher propellers 60 and 62. Through the use of contra-rotating propellers, or propellers rotating in opposite direction, the resultant torque applied to the aircraft 12 cancel each other, thus greatly simplifying yaw and roll control. The forward thrust of the propellers 60 and 62 is transmitted to the housing 48 through each one of a pair of inclined thrust and support members 64 and 66, each made of a relatively light but relatively rigid metallic beam fastened at an angle at its base to a side of the housing 48. Each thrust beam is provided at its free end with an appropriate journal and thrust bearing rotatably supporting a propeller shaft on which is keyed an appropriate drive pulley, 68 and 70, for the corresponding propeller, 60 and 62, each propeller drive pulley being driven respectively by the drive belt 56 or 58.

A towline hitch and guide mechanism is provided in the form, for example, of a tubular member 72 pivotably mounted, FIGS. 2 and 3, at one end by appropriate brackets 73 to the housing 48 for free pivoting about a horizontal axis, as shown at 74. The tubular member 72 thus is free to pivot to a certain degree about a horizontal axis between the two propeller discs but is restrained from lateral motion, or pivoting about a vertical axis, to prevent contact with the propeller tips. The tubular member 72 functions as a support and guiding means for the towline 14 during towing for preventing contact with the propeller tips, and during winding of the towline prior to landing, as will be hereinafter explained, by means of a winch mounted in or on the housing 48. In arrangement and in locations where possible entanglement of a dragging towline with ground obstacles is not to be expected, the towline may simply be attached to a loop provided on the end of the tubular guiding and support member 72 or of a vertically pivotable rigid rod projecting between the two propeller discs.

The towline 14 is preferably a thin, relatively light cable made of synthetic material such as nylon and the like. A towline made of such material presents the double advantage of having a pronounced amount of elasticity under tension and, by proper choice of the line, of having a limited resistance to rupture under tension, such that the line will break prior to exerting a pull on the towed glider which could exceed safe limits. As about 100 lbs. thrust is adequate for towing the hang glider, an appropriate choice of line modulus of rupture under tension is limited to a maximum of about 300 lbs. for safety reasons. About 150 lbs. is the minimum which could be used to insure reliability of towing under normal conditions.

A radio receiver, not shown, and appropriate actuating servos are enclosed in the housing 48, a vertically disposed whip antenna 76 being mounted on the top of the housing 48 or at any appropriate other convenient location for receiving the signals emitted by the antenna of the radio control transmitter 26 at the disposal of the ground crew member 20, FIG. 1. Vertically disposed whip antennas cause vertical polarization of the transmitted waves requiring a vertical aerial for receiving but, if it is desired to operate the radio control system with horizontal polarization in order to avoid interference with radio communications occurring on the same or on adjoining frequencies with vertical wave polarization, the antenna of the transmitter 26 may be disposed horizontally, and the whip antenna 76 of the receiver on the aircraft 12 may be replaced by a dipole antenna wire stretched above the upper wing 28 or between the two wings. The wing span of the towing aircraft 12, being approximately 30 feet, provides ample room for spanwise mounting of a full wavelength dipole receiving aerial, even when operating in the convenient 27 Mhz frequency range.

The radio control system for controlling from the ground the flight of the tractor aircraft 12 consists of a multi-channel system quite similar to systems presently used for radio control of large model airplanes. As shown at FIG. 4, a 6-channel radio control system of the type currently available on the market at a relatively low cost is quite adequate for the present invention. A minimum of four channels are required, one of the channels being used for a throttle input 80, and two channels for the yaw inputs, respectively the right yaw input 82 and the left yaw input 84. Two yaw inputs are required for controlling the towing aircraft 12 in view of the fact that it is designed for separate actuation of the wing tip draggers for turning. By using a tractor aircraft in the form of a motorized hang glider provided with a conventional tail rudder, only one channel will be required for yaw input. The pitch control input and the towline winch drive-input, if used, require two additional channels. With the exception of the towline winch control input which is of the on-off type, all the other control inputs are of the proportional type.

The input command signals, after encoding through an encoder 90 are transmitted, appropriately modulated, by the aerial of the transmitter 26 and received by the aerial of an appropriately attuned receiver 92 mounted on the tractor aircraft. After decoding through a decoder 94, the command signals are separated and applied to the input of the appropriate servos. The throttle position command signals are applied to the throttle servo 96 which operates the engine throttle, the right turn command signals operate a right turn servo 98 which operates the appropriate dragger, the left turn command signals operate a left turn servo 100 which operates the appropriate dragger controlling left turns. The pitch control command signal operates an elevator servo 102 which operates in turn the elevators 38 and 40 in unison. The towline winding command signal activates a towline winding servo 104 which triggers the start of a motor 106 driving a small winch 108 adapted to rewind the towline 14 prior to landing the towing aircraft.

Figure 5:
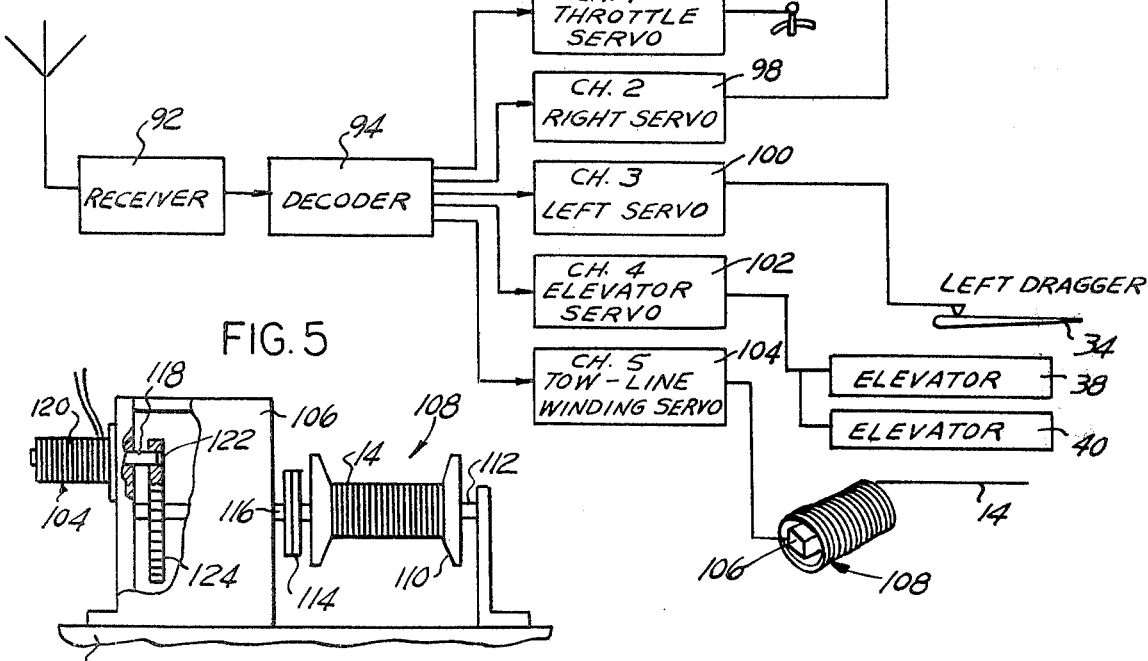
FIG. 5 is a schematic elevation view with a portion removed of the two line wind-up mechanism thereof.

FIG. 5 schematically illustrates an example of towline winding winch 108 particularly well adapted for winding the towline 14 prior to landing the tractor aircraft 12. The winch 108 comprises a rotatable spool 110, around which the towline 14 is wound, supported by a rotatable shaft 112 and driven through a releasable coupling 114, or other appropriate connecting and disconnecting member, by the output shaft 116 of the winch drive motor 106. In the example illustrated, the winch drive motor is a spring windup motor. Prior to takeoff of the tractor aircraft with a piloted hang glider in tow, an appropriate length of towline 14 is unwound from the spool 110, after disengaging the coupling 114. The spring, not shown, of the spring windup motor 106 is wound, and the plunger 118 of a solenoid 120 defining the towline winch servo 104 is engaged into an appropriate recess 122, or other abutment means, formed in one of the gears or toothed wheels 24 of the gear train of the spring windup motor 106, between the spring actuated shaft and the output shaft 116. The spring windup motor 106 is thus prevented from unwinding. After an appropriate length of towline is pulled through the towline support and guide 72 (FIGS. 2 and 3), the coupling 114 is re-engaged, thus coupling the spool 110 through the shaft 112 to the locked output shaft 116 of the spring windup motor 106.

After towing the piloted hang glider to altitude, if it is desired to retract the towline 14 after launching of the hang glider and prior to landing the tractor aircraft 12, the towline control input 88, FIG. 4, is operated at the transmitter end, which in turn operates the towline winding servo 104, or solenoid 120, FIG. 5, causing the solenoid plunger 118 to retract from the opening 122 in the toothed wheel 124 of the spring windup motor 106, thus enabling the spring windup motor to drive, through its output shaft 116 and the coupling 114, the towline winding spool 110.

Driving means other than a spring windup motor may be used, such as for example a stalled DC motor which would dispense with a servo as it would be capable of automatically driving the winch spool 110 as soon as the towed hang glider is launched and no longer exerts a pull on the end of the towline 14. A stalled windup spring motor could also be used in the same manner. Alternatively, the towline winding servo 104 could operate the on-off switch of an electric motor.

For better maneuverability of the tractor aircraft, the point of attachment of the towline 14, which corresponds substantially to the axis 74 of vertical pivoting of the towline support and guide tubular member 72, FIG. 2, and to the axis of the windup spool 110 of the winch 108, FIG. 5, is located at the coinciding center of gravity and center of lift of the wings of the tractor aircraft.

Figure 6:
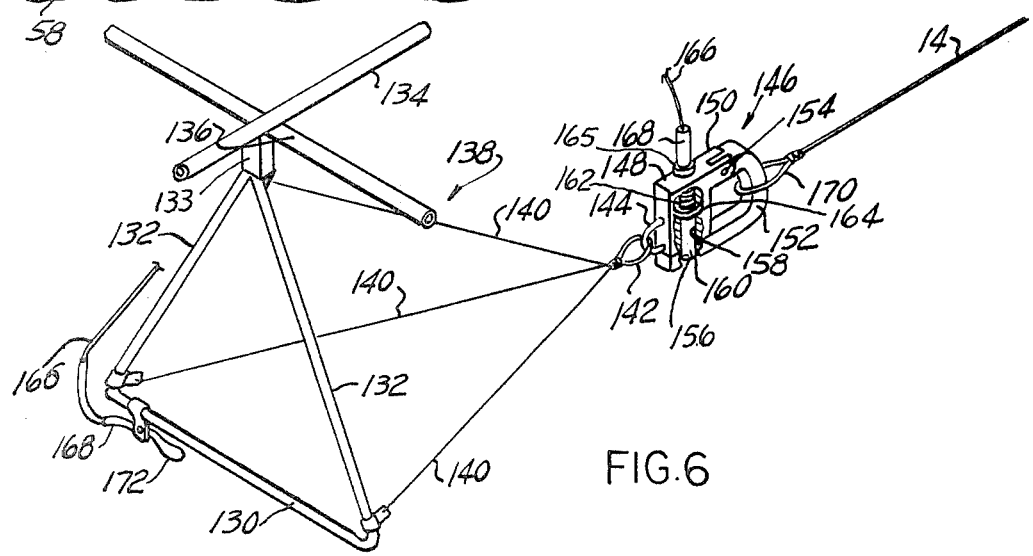
FIG. 6 is a partial perspective view, with portion removed to show the internal construction, of an example of hang glider tow line hitch, according to the present invention.

An example of hitch mechanism for attaching to the hang glider the end of the towline 14 is represented at FIG. 6. As is well known, hang gliders are controlled by means of a control bar 130 which is attached to the bottom of or made integral with, as illustrated, a pair of symmetrically disposed support bars 132, such that the control bar 130 and support bars 132 form a generally isoceles triangle. The other ends or tops of the support bars 132 are attached by means of appropriate mounting brackets 133 to the wing keel 134 of the hang glider, as shown at FIG. 6, and generally also to the wind main spar or brace 136 according to the type of wing construction used by the glider. The control bar 130 is further braced by means of cables, not shown, to diverse portions of the wing. The present invention contemplates attaching to the three corners of the triangle formed by the bars 132 and 130 a tow hitch structure 138 consisting of three cables 140 of substantially equal length having an end attached to each apex of the control bar triangle, the cables 140 forming the corners of a pyramid interconnected at the vertex of the pyramid to form a loop or ring 142 permanently attached through an integral half-ring 144, for example, to a controllably releasable clasp 146. The releasable clasp 146 comprises a housing 148 having an integral bifurcated projection 150 on the side thereof opposite the side provided with the half loop 144. A generally semi-circular loop member 152 has an end disposed between the side walls of the bifurcated side projection 150 and is hingedly attached thereto by means of a pivot pin 154. The other end of the pivotable half loop member 152 is provided with a lateral bore 156 which is aligned with a longitudinal bore 158 formed in the housing 148 when the clasp 146 is closed, that is with the side surface of the end of the half loop 152 provided with the bore 156 in engagement with the end of the housing 148. A plunger 160 is urged by a compressed coil spring 162 disposed in an enlarged portion of the bore 158, in the direction causing the end of the plunger 160 to project within the bore 156, thus locking the half loop member 152 in a closed position, a shoulder portion 164 of the plunger 160 engaging an annular surface in the bore 156 separating the reduced diameter portion thereof from the enlarged diameter portion thereof. The coil spring 162 is held in compression by means of a fitting 165 threading into the end of the enlarged portion of the bore 156. The fitting 165 is tubular to afford a passage for a flexible steel cable 166 provided with a flexible tubular sheath 168, the end of the cable 166 passing also through the coil spring 162 and being attached to the enlarged end 164 of the plunger 160. When a pull is exerted on the inner cable 166, the pin 160 is withdrawn from the bore 156, thus freeing the half loop member 152 to permit it to pivot freely around the pivot pin 154 such as to free the towline 14 having an appropriate looped end 170 through which the body of the half loop member 152 is passed when in a latched position. Opening of the clasp 146 may be aided by means of a spring, not shown, disposed at the pivot point of the half loop member 152 and urging it in the open position.

Opening of the hitching clasp 146 to release the towed hang glider for free flight is under the control of the hang glider pilot by means of a release lever 172 clamped on the control bar 130 or, if so desired, on one of the support bars 132 of the control bar and manually squeezed by the hang glider pilot any time he desires to disconnect from the towline 14. Squeezing the handle 172 towards the control bar 130 pulls on a flexible inner cable and withdraws the pin 160, thus opening the clasp 146.

Means, not shown, such as appropriate cables may be used to support the clasp 146 after unhitching, such as to not interfere with the hang glider pilot's action during flight and during landing, or, in the alternative, the whole assembly consisting of the hitch clasp 146 and the mounting cables 140 may be made jettisonable.

It will be appreciated that the releasable hitch clasp of FIG. 6 is given only for illustrative purpose, and that other mechanisms, such as those presently available on the market for releasing a hang glider being towed by a motor vehicle, motor boat, or ground vehicle may be used for the purpose of controllably releasing the hang glider under tow according to the teachings of the present invention.

The engine used to motorize the towing aircraft 12 of FIGS. 1-3 is preferably a small, light two-cycle air-cooled gasoline engine of about 25-35 hp. A plurality of engines suitable for the purpose of the invention are available on the market, such as engines used to propel snowmobiles. The power unit including the engine, fuel, the housing 48, and the tricycle landing gear 42 can be supplied in the form of a module, which may also include the radio receiver and the control servos, which is bolted on and disconnected from the wings relatively rapidly and without any special skills. The module unit has a total weight, of about 150-170 lbs., that is not more than the weight of a pilot of normal weight, and much less than the combined weight of a pilot and of the power unit used to motorize hang gliders, with the result that the speed envelope of the tractor aircraft matches the speed envelope of the towed piloted hang glider, and that the rates of climb of the two flying machines are perfectly matched. The total weight of the tractor aircraft is about 210 lbs.

Having thus described the present invention by way of examples of structure thereof, modifications whereof will be apparent to those skilled in the art, what is claimed as new is as follows:

1. A pilotless powered aircraft for towing a piloted motorless aircraft by means of a towline, said pilotless powered aircraft comprising a lifting surface, a yaw control surface and a pitch control surface, a thrust-providing power unit attached to said lifting surface, and a radio control receiver for operating said thrust-providing power unit, said yaw control surface and said pitch control surface as a function of command signals remotely transmitted from the ground by means of a radio transmitter, and means under the control of the pilot of said piloted motorless aircraft for releasing said towline, wherein the range of minimum to maximum flying speed of one of said aircraft overlaps substantially the range of minimum to maximum flying speed of the other of said aircraft, wherein said towline is stressed to break as a result of a pulling force exerted thereon in the range of about 1.5 to 3 times the maximum thrust exerted by said thrust-providing power unit, and wherein said piloted motorless aircraft is a hang glider and the lifting surface of said pilotless powered aircraft is a hang glider.

2. The combination of claim 1 wherein said pilotless powered aircraft is provided with a tricycle landing gear undercarriage.

3. The combination of claim 1 wherein said thrust-providing power unit is a gasoline engine driving a pair of contra-rotating pusher propellers.

4. The combination of claim 1 further comprising power winch means mounted on said pilotless powered aircraft for winding up said towline after release of said motorless aircraft.

5. The combination of claim 4 further comprising servo control means controllable by said radio receiver upon receiving an appropriate command signal for starting the operation of said power winch means.

6. The combination of claim 4 wherein said winch means is powered by a spring windup motor.

7. The combination of claim 1 wherein the minimum flying speed of both said aircraft is comprised between about 15 and 25 mph.

8. The combination of claim 1 wherein said towline is attached to said pilotless powered aircraft at the center of gravity of said pilotless powered aircraft.

9. A method of towing a piloted motorless aircraft by means of a powered aircraft provided with a thrust-providing power unit, said method comprising connecting said powered aircraft to said piloted motorless aircraft by means of a releasable towline, towing said piloted motorless aircraft to altitude by said powered aircraft, controlling said powered aircraft from the ground by means of a remote radio-controlled link, and releasing said towline from said piloted motorless aircraft when reaching an appropriate altitude, said releasing of said towline being effected by the pilot of said piloted motorless aircraft, wherein the range of minimum to maximum flying speed of one of said aircraft overlaps the range of minimum to maximum flying speed of the other of said aircraft and said towline is arranged to break upon a pull exerted thereon which is about 1.5 to 3 times the pull exerted by said powered aircraft power unit and wherein said piloted motorless aircraft is a hang glider and said powered aircraft has a hang glider lifting surface equipped with said thrust-providing power unit.

10. The method of claim 9 wherein the minimum flying speed of both said aircraft is comprised between about 15 and 25 mph.

11. The method of claim 9 further comprising retracting said towline after release of said towline.

12. The method of claim 9 wherein said thrust-providing power unit is a gasoline engine driving a pair of contra-rotating pusher propellers.

13. The method of claim 9 wherein said towline is attached to said pilotless powered aircraft at the center of gravity of said pilotless powered aircraft.

* * * * *

UNITED STATES PATENT AND TRADEMARK OFFICE
CERTIFICATE OF CORRECTION

PATENT NO. : 4,248,394
DATED : February 3, 1981
INVENTOR(S) : Marlin K. Klumpp

It is certified that error appears in the above-identified patent and that said Letters Patent are hereby corrected as shown below:

Column 7, line 44, change "24" to --124--.

Signed and Sealed this

Twenty-eighth Day of July 1981

[SEAL]

Attest:

Attesting Officer

GERALD J. MOSSINGHOFF
Commissioner of Patents and Trademarks